Sept. 20, 1971         H. L. BOESE        3,605,434
REFRIGERATION APPARATUS INCLUDING A CONVEYOR
AND EMPLOYING CRYOGENIC FLUID
Filed Nov. 12, 1969
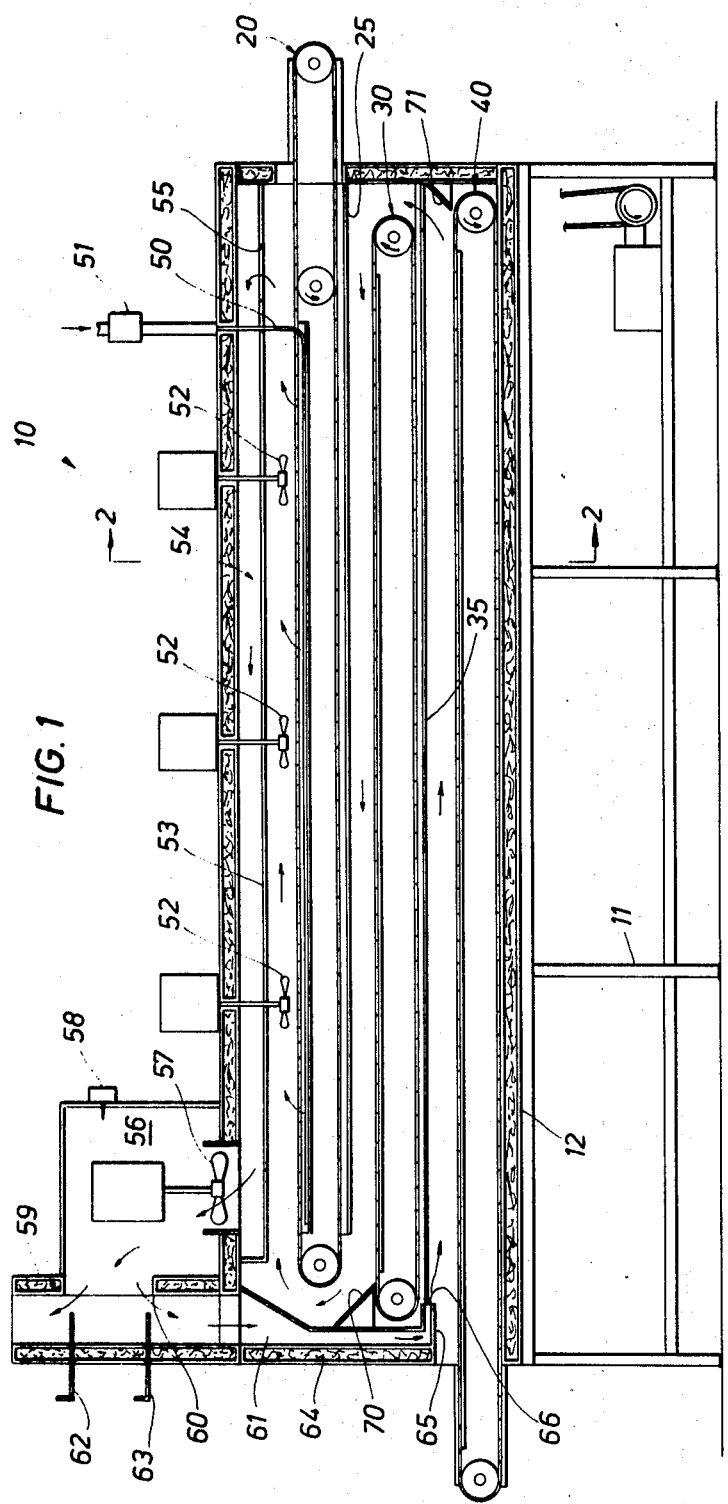
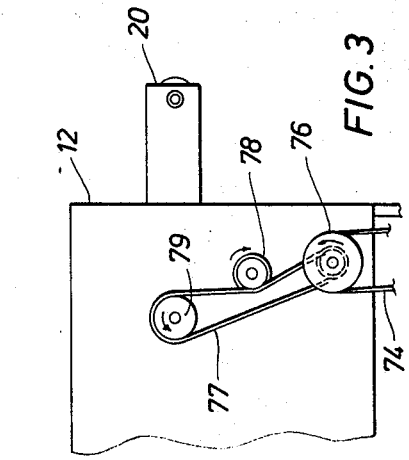
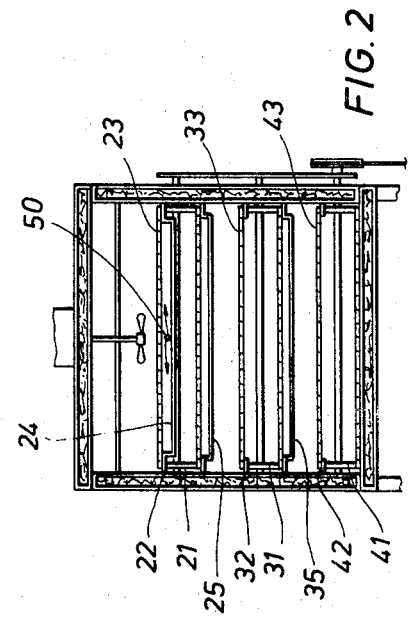
Harold L. Boese
INVENTOR
BY Donald Gunn
ATTORNEY

3,605,434
REFRIGERATION APPARATUS INCLUDING A CONVEYOR AND EMPLOYING CRYOGENIC FLUID
Harold L. Boese, Houston, Tex., assignor to James L. Foster and W. D. Boyd, Houston, Tex., fractional part interest to each
Filed Nov. 12, 1969, Ser. No. 875,825
Int. Cl. F25d *17/00*
U.S. Cl. 62—374                     7 Claims

ABSTRACT OF THE DISCLOSURE

Refrigeration apparatus using a cryogenic liquid wherein the apparatus includes multiple segments of a conveyor system which are stacked one on top of the other in a single chamber and the cryogenic liquid is introduced approximately near the point where the food to be frozen is introduced to place a quick surface freeze thereon to protect the quality of the product, and wherein the cryogenic liquid evolves a cold gas which is drawn off and forced back along the conveyor system in a counter flow traveling along the length of the various conveyor segments and the apparatus further includes a chimney for conducting hot gases away from the apparatus, the chimney being connected with the gas flow system and the amount of gas deviated to the chimney and the amount directed to the gas flow system being controlled by louvers placed in the system.

SUMMARY OF PROBLEM AND INVENTION

In the processing of food, it has been discovered that the quality of the food is materially protected if it is quickly frozen, typically below —10° F. Preferably, the food is quickly frozen to prevent the water crystals in the food from becoming too large and rupturing cell structures within the food. Moreover, the food is preferably frozen from the outside in, which prevents water vapors from escaping from the food. If these precautions are not obtained, the food may lose some of its taste and become unattractive.

Apparatus to which the present invention relates has been utilized in the past, although its performance has not been outstanding. A particular problem with equipment presently used is the cost of operation. The present invention materially improves the cost of operation, and further, quickly freezes the surface of the food product to prevent escapage of water vapors or the formation of large water crystals, to protect the quality of the frozen product. Moreover, the possibilities of freezer burn are likewise reduced inasmuch as the present invention does not contact the food product against the cryogenic liquid with the encumbant risk of freezer burn.

The present invention is summarized as including multiple segments of a conveyor system which are preferably placed one over the other and in a relatively short refrigerated housing. A cryogenic liquid is introduced near the point of admission of the warm food, and the gases evolved by the liquid place a quick surface freeze on the food product. The gases evolved are quite cold, and are drawn off through an exhaust manifold system which directs the gases to a chimney. However, dividers in the exhaust manifold system at its junction with the chimney direct the warm portion of the gases up the chimney, and the cold portion of gases are recirculated through the equipment for further cooling of the food product as it travels through the equipment. Once the surface chill is applied to the product, the remaining portions of the conveyor system provide a cold soak which lowers the temperature through the product toward the desired temperature, typically in the area of —10° F., in the case of meats.

Many objects and advantages of the present invention will become more readily apparent from a consideration of the specification and drawings, which are:

FIG. 1 is a sectional view showing the internal workings of the refrigeration equipment of the present invention;

FIG. 2 is a sectional view taken along the line 2—2 of FIG. 1 illustrating details of construction of the several conveyors which are stacked one on the other; and, FIG. 3 is a partial view of the external housing at one end of the apparatus showing the connection of the power system to the apparatus.

In the drawings, the numeral 10 in FIG. 1 indicates the freezing equipment of the present invention generally. It incorporates a support frame indicated generally by the numeral 11 which is preferably made of angle iron or the like. The support framing 11 supports a double wall, insulated freezer chamber of substantial size. By way of example and not limitation, the chamber may be perhaps twelve to fifteen feet in length, three to five feet in height, and the width may vary from perhaps two feet to as much as four feet, depending on the quantity of the product to be frozen. Clearly, the dimensions of the freezer cabinet are subjected to variation over a wide range dependent on the size of the product to be frozen, the desired production rate, and other similar factors. Preferably, the freezer cabinet is double walled and may be formed of a conventional non-corrosive material such as stainless steel with foamed urethane insulation, fiberglass insulation, or any other suitable insulation found desirable. Inasmuch as the gas traveling through the equipment may be as cold as —240° F., it will be understood that the temperature differential through the wall is substantial in many environments, and consequently, the use of a double wall refrigeration chamber is considered highly desirable.

Several practical factors should be noted concerning the apparatus of the present invention, such as the inclusion of latch-type doors on the sides of the equipment which expose the interior for ease of cleaning or inspection. Moreover, it may be desirable to place drain plugs on the bottom wall at several points depending on the cleaning problem to be encountered, the inspection laws which prevail at the point of use of the present equipment, and other such factors. Practical considerations of this nature have been omitted from the present disclosure inasmuch as they are not related to the inventive concept herein disclosed.

Broadly, the apparatus includes three conveyor systems, the first of which is indicated by the numeral 20, the second of which is indicated by the numeral 30, and the third and last being indicated by the numeral 40. The conveyor system 20 introduces the food into the chamber for the purpose of providing a quick chill on the surface of the food product. The conveyor system 30 is immediately beneath the conveyor 20, and transfers the food from the left-hand end to the right-hand end of the equipment as viewed in FIG. 1. Thereafter, the food is dropped to the conveyor 40 which travels from right to left as viewed in FIG. 1 and it is delivered at one end to permit an operator to remove the food product from the conveyor system. The conveyors 30 and 40 keep the food moving in a stream of cold gases to provide a cold soak which further extends the surface chill placed on the food products, and which also tends to lower the temperature of the food products all the way through the product so that the entirety of the product will be at the desired cold temperature. By surface chill, the outer layer of food is actually frozen so that the liquids in the outer layer are actually small ice crystals.

The several conveyor belts or systems will be described jointly, it being understood that their construction is approximately identical, and the only factors which differ are principally the length of the conveyor systems and their location in the equipment. Preferably, each conveyor system is formed of an open chain link belt which is adapted to carry the food product thereon. By way of example, a typical food product might be meat patties, whole steaks, and the like. If the present invention is intended for use with granular products, such as corn, beans or peas, the mesh or gauge of the chain link conveyor belt must be changed to prevent the food product from falling through. The embodiment herein discussed is intended for use with larger products, and hence the mesh or gauge of the link chain is quite large.

The conveyor system is composed of a support frame indicated by the numerals 21, 31 and 41 in FIG. 2. The support frame is essentially a box structure which provides right hand and left hand upwardly protruding lips as indicated by the numerals 22, 32 and 42 in FIG. 2. It will be observed that the lips are located on both sides of the equipment to support the link chain proper. The link chain is indicated by the numerals 22, 33 and 43. The generally rectangular box-like structure which extends the length of the several conveyors extends across the full width of the conveyor belts and supports the lips 22, 32 and 42 for holding the chain in a generally horizontal posture throughout the apparatus 10. Moreover, at the ends, the box-like frame supports the drive and idler sprockets to be described hereinafter. The sprockets engage the link chain at the left and right edges for guiding the chain as it moves in the equipment and to provide the motive force to the chain.

Of particular interest to the upper conveyor is the inclusion of a coolant pan indicated by the numeral 24. The pan 24 is located just beneath the upper course of the link chain belt 23. The pan 24 is not too deep inasmuch as the liquid introduced to the pan is quickly vaporized and tends to boil off, evolving a cold gas. A feed line 50 delivers cryogenic liquid to the pan 24 for vaporization just below the food product. Preferably, the feed line 50 extends the length of the first conveyor 20 and has small openings to deliver and distribute the cryogenic liquid at several points along the conveyor 20.

Additionally, a divider 25 is positioned beneath the conveyor 20 to isolate the cold gases in the region of the conveyor 20 from the gases in the region of the conveyor 30. It will be understood that the gases passing along the conveyor 30 are likewise cold, but they are not quite so cold as the gases near the conveyor 20. Once the recirculation cycle through the equipment of the present invention is traced, it will be demonstrated how the gases near the conveyor 20 are much colder than those at other points in the equipment. For the same reason, a divider 35 extends across the equipment just below the conveyor system 30 for the same purpose. The divider 35 separates or defines the regions adjacent the conveyors 30 and 40 and prevents intermingling of the gases near those regions. Of course, the conveyor system 40 is positioned just above the bottom of the equipment, and consequently, a separate divider below the conveyor system 40 is not required.

In summation, each conveyor system includes a link chain of predetermined length supported on sprockets at opposite ends which traverses the length of the equipment on support lips below the edges of the link chain. The link chain travels through the equipment for cooling the food products to the desired temperature. Preferably, each conveyor assembly 20, 30 and 40 is individually fabricated and is placed in the equipment resting on the several divider trays as a unit or assembly to accommodate cleaning. That is to say, the link chain and box assembly associated with each conveyor segment is easily removed for cleaning once the drive system to be described with respect to FIG. 3 is disconnected. More will be noted concerning this hereinafter.

To this juncture, the conveyor systems 20, 30 and 40 have been described generally. Attention is now directed to FIG. 1 for a description of the gas flow system. Briefly, a valve 51 controls fluid flow through the feed line 50 which introduces the cryogenic liquid to the apparatus. The cryogenic liquid is received in the tray 24 shown in FIG. 2. The cryogenic liquid evolves a cold gas which passes through the link chain belt 23 and puts the surface chill on the product. The gas is swirled and agitated as it evolves from the tray 24 by a number of rotary fans indicated by the numeral 52. The fans 52 are at spaced locations along the length of the belt 20. The fans 52 are driven by suitable electric motors having a shaft extending to the double wall of the cabinetry and are positioned a few inches above the link chain 23. Preferably, the gas is spun in a vortex to provide a high degree of agitation to the gas. It is not necessary to drive the gas at high velocities or substantial distances through the equipment inasmuch as gas is being evolved at several points along the conveyor system 20.

The numeral 53 indicates a divider wall which separates an exhaust manifold system 54 from the vicinity of the conveyor system 20. An opening 55 in the wall 53 draws gas from the vicinity of the first conveyor 20 into the exhaust manifold 54. It should be noted in particular that the food travels from right to left as viewed in FIG. 1, while the gas is evolved at all points along the conveyor travels from left to right, counter-flowing against movement of the food to enter the exhaust manifold 54.

The exhaust manifold 54 communicates along the length of the equipment to a blower chamber indicated by the numeral 56. The blower chamber includes a fan 57 which draws the cold gases through the exhaust manifold and into the chamber 56. The fan 57 is again powered by a suitable electric motor.

A thermostat 58 is attached to the side wall of the chamber 56 and protrudes into the chamber with a sensitive element to read the temperature of the gases in the chamber. As the gases pass through the chamber, the thermostat 58 responds to the gases. If desired, the thermostat 58 may be connected with the valve 51 to open and close the valve to control the flow of cryogenic liquid into the refrigerating apparatus 10. As more liquid is introduced, the temperature drops in the chamber 56 and the thermostat 58 responds to the drop in temperature to further regulate the valve. It will be understood that the use of a thermostat to open and close a valve is believed well understood by one skilled in the art.

The chamber 56 communicates with a chimney 59. The chimney 59 exhausts the hot gases which rise in the chamber 56 to atmosphere inasmuch as the cooling power of those gases is fairly well depleted. On the other hand, the cooler gases settle toward the bottom of the chamber 56 and spill over the edge at 60 and into a downtake 61. The chimney 59 and the downtake 61 are separated one from the other by movable louvers 62 and 63 which are inserted into the passage defining the chimney 59 and the downtake 61. As viewed in FIG. 1, the chimney 59 and the downtake 61 may be described as a continuous passage save for the division provided by the movable louvers 62 and 63. The louvers 62 and 63 preferably have hand grips on the exposed outer end to permit them to be pushed into or pulled away from the slots in which they are positioned. Thus, the louvers 62 and 63 may be inserted or withdrawn to an extent determined by the operating conditions of the equipment. Thus, should it be desirable to vent all of the gases drawn through the fan 57, the louver 63 is shoved in until it abuts the edge 60, which closes the down draft 61. The louver 62 is fully opened to expose the chimney 59 and all the gases are vented to atmosphere. On the other hand, a division of gas flow is accomplished by the positions shown in FIG. 1 such that the warmer gases rise to the top and out the chimney and the cooler gases are drawn into the downtake 61. Of course, the louvers 62 and 63 may be motor controlled as a matter of facility.

The downtake 61 is a portion of a door 64 which exposes the end of the equipment for servicing, cleaning and the like. The door 64 is preferably wedged against the side walls of the cabinet or housing 12. The downtake 61 narrows to a relatively small width at 65 and forms in effect an injection nozzle at 66 which directs a draft of very cold gases along the top side of the conveyor system 40 in a counterflow pattern extending across the width of the belt. The gases are drawn across the full length of the belt by the combined force of the draft at the nozzle 66 and by operation of the exhaust manifold as will be described hereinafter. The gases from the nozzle 66 travel the full length of the conveyor 40 and turn upwardly at the right hand end of the equipment in the vicinity of the conveyor 30. It will be noted that the conveyor 30 is not quite as long as the conveyor 40 at the right hand end of the equipment. The gas is passed around the conveyor beneath the divider plate 35 which was previously described with respect to FIG. 2. The gases then counterflow along the length of the conveyor 30 to the left hand end of the equipment. There, the gases are redirected to flow along the top conveyor system 20 back toward the opening 55 of the exhaust manifold. It will be understood that the flow through the entirety of the system is a combination of the forced draft from the nozzle 66 and the suction at the opening 55.

The course of the food through the conveyor system should be noted. The conveyor 20 travels from right to left and a deflector surface 70 deflects the food as it falls off the conveyor 20 and tends to turn it so that the food is flipped for further chilling. As the food travels along the conveyor system 30 and tumbles off the right hand end, a deflector 71 again turns the food for traversing the equipment on the conveyor 40. The several deflectors also help deflect the gas flow and further define the passages therefor.

Attention is momentarily directed to FIG. 3 which illustrates a drive chain or link belt 74 which is connected with a suitable electric motor of appropriate size, and which extends about a drive sprocket 76. The drive belt 77 rotates the drive sprockets 78 and 79 as shown in FIG. 3. Preferably, the sprockets have a suitable number of teeth so that the conveyor 20 moves at a certain rate of speed, the conveyor 30 moves slightly faster, and the conveyor 40 even faster still. The increase in speed need not be too great, but is only sufficient to keep the food products from stacking on top of one another when turned. Thus, when the food products fall from the conveyor system 20, the conveyor system 30 should remove them from the turning baffle 70 relatively quickly so that the spacing between the products is slightly increased. This will prevent the happenstance of food stacking, which has a generally undesired effect on the cooling of the food products.

The preferred gas for the present invention is liquid nitrogen. It has been found quite useful in several regards, and provides a quick chill to the food products. Moreover, the latent heat of liquid nitrogen is quite high, and as a consequence, liquid nitrogen is very acceptable for use with the present invention. Experimental data in the use of the present invention with meat patties has been quite good. The present invention is a substantial improvement over devices of the priod art which have required as much as one pound of coolant for each pound of meat to be frozen. As a matter of economy, the present apparatus may be used with a soak freezer or chill room for the purpose of further depressing the temperature at the center portions of the food products when the products are quite thick. The present invention is particularly well adapted for placing a surface chill on the products which is the first and major requirement for its operation.

The foregoing has been directed to the preferred embodiment of the present invention. It will be understood that numerous and several variations in the structure may be arranged. Further, the apparatus may be modified, expanded or enlarged in accordance with the teachings herein. The terms and definitions adapted herein are applied to the claims which are appended hereto.

What is claimed is:

1. Quick-freezing apparatus adapted for freezing food products and comprising: an elongated enclosure adapted to be placed in a generally-horizontal position and having an elevated food-entry opening, a lower food-exit opening, and a vapor-exhaust opening adapted for removing vapors from near the top of said enclosure; a plurality of elongated baffles mounted horizontally at vertically-spaced intervals within said enclosure and cooperatively arranged for dividing the interior thereof into a plurality of isolated horizontal spaces communicating with one another only near alternate ends of said enclosure to define an alternately-directed vapor passage therein beginning adjacent to the bottom and one end of said enclosure and continuing in a selected direction back and forth along the length of said enclosure to said vapor-exhaust opening; a plurality of elongated conveyors respectively mounted horizontally within each of said isolated spaces and cooperatively arranged therein for transporting food products back and forth through said vapor passage from said food-entry opening to said food-exit opening in the opposite direction from said selected direction; an elongated pan adapted for receiving cryogenic liquids mounted horizontally below the uppermost one of said conveyors and cooperatively arranged for distributing cold vapors evolving from such liquids upwardly across food products being transported along said uppermost conveyor away from said food-entry opening; and gas-circulating means cooperatively arranged on said enclosure and including means defining a plenum chamber in communication with said vapor-exhaust opening, a vapor-diversion passage between said plenum chamber and the beginning of said alternately-directed vapor passage for directing cool vapors from said plenum chamber to said alternately-directed vapor passage for passage therethrough in said selected direction across food products being transported in said opposite direction along said conveyors, a vapor-exhaust passage between said plenum chamber and the exterior of said enclosure, louver means cooperatively arranged for selectively diverting warm vapors into said vapor-diversion passage, and blower means cooperatiely arranged in said plenum chamber for drawing vapors from said alternately-directed vapor passage and said vapor-exhaust opening into said plenum chamber.

2. The apparatus of claim 1 wherein there are three of said conveyors respectively arranged in adjacent ones of said isolated spaces with said food-exit opening being in said one end of said enclosure and said food-entry opening being in the other end of said enclosure.

3. The apparatus of claim 2 wherein there are four of said isolated spaces and said three conveyors are respectively arranged in the three lower isolated spaces with said vapor-exhaust opening being in communication with the uppermost other one of said four isolated spaces.

4. The apparatus of claim 1 wherein said gas-circulating means include at least one fan cooperatively arranged in that one of said enclosed spaces containing said uppermost conveyor and said elongated pan for agitating cold vapors evolving from cryogenic liquids therein.

5. The apparatus of claim 1 further including thermal insulation cooperatiely arranged on said enclosure for minimizing heat gain to the interior of said enclosure.

6. The apparatus of claim 1 further including: means coupled to each of said conveyors and cooperatively arranged for driving said uppermost conveyor at a slower speed than the others of said coneyors to distribute food products along the length of said conveyors.

7. The apparatus of claim 1 further including: a cryogenic liquid distributor cooperatively arranged in said elongated pan for discharging cryogenic liquids into said pan; and means cooperatively arranged for supplying cryogenic liquids to said liquid distributor.

References Cited

UNITED STATES PATENTS

| | | | |
|---|---|---|---|
| 3,482,412 | 12/1969 | Waldin | 62—63 |
| 3,485,055 | 12/1969 | Webster et al. | 62—63 |
| 3,494,140 | 2/1970 | Harper et al. | 62—190 |

MEYER PERLIN, Primary Examiner

R. C. CAPOSSELA, Assistant Examiner

U.S. Cl. X.R.

62—380